(12) United States Patent
Moulsley

(10) Patent No.: US 7,403,514 B1
(45) Date of Patent: Jul. 22, 2008

(54) TELECOMMUNICATION SYSTEM WITH CHANNEL SHARING

(75) Inventor: Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/335,608

(22) Filed: Jun. 18, 1999

(30) Foreign Application Priority Data

Jun. 23, 1998 (GB) .................................. 9813390.3

(51) Int. Cl.
*H04J 3/00* (2006.01)
*H04B 7/00* (2006.01)
*H04L 12/66* (2006.01)

(52) U.S. Cl. .................. 370/345; 370/349; 370/353; 370/493; 370/498

(58) Field of Classification Search ................. 370/329, 370/337, 433, 435, 437, 352
See application file for complete search history.

(56) References Cited

U.S. PATENT DOCUMENTS

| | | | | |
|---|---|---|---|---|
| 5,341,397 A | * | 8/1994 | Gudmundson | 370/335 |
| 5,396,539 A | | 3/1995 | Slekys et al. | 370/341 |
| 5,504,773 A | * | 4/1996 | Padovani et al. | 375/130 |
| 5,701,297 A | | 12/1997 | Csapo et al. | 370/341 |
| 5,818,871 A | * | 10/1998 | Blakeney et al. | 375/220 |
| 5,881,060 A | * | 3/1999 | Morrow et al. | 370/337 |
| 5,892,794 A | * | 4/1999 | Slegers | 370/294 |
| 5,912,894 A | * | 6/1999 | Duault et al. | 370/329 |
| 6,005,852 A | * | 12/1999 | Kokko et al. | 370/329 |
| 6,011,784 A | * | 1/2000 | Brown et al. | 370/286 |
| 6,078,566 A | * | 6/2000 | Kikinis | 370/286 |
| 6,256,298 B1 | * | 7/2001 | Nakajo | 370/328 |
| 6,295,302 B1 | * | 9/2001 | Hellwig et al. | 370/522 |
| 6,393,000 B1 | * | 5/2002 | Feldman | 370/316 |
| 6,477,176 B1 | * | 11/2002 | Hamalainen et al. | 370/435 |

FOREIGN PATENT DOCUMENTS

WO WO9722216 6/1997

* cited by examiner

*Primary Examiner*—Chi Pham
*Assistant Examiner*—Soon D. Hyun
(74) *Attorney, Agent, or Firm*—Paul Im; Michael E. Belk

(57) ABSTRACT

A telecommunication system uses at least one dual mode channel capable of supporting variable-rate real-time data (e.g. speech) and non-real-time packet data. The packet data is queued in a buffer and transmitted when the data rate of the real-time data stream is less than the full data capacity of the channel.

16 Claims, 2 Drawing Sheets

TELECOMMUNICATION SYSTEM WITH CHANNEL SHARING

The present invention relates to telecommunication systems with communication channels established between first and second stations, for example between a base station and mobile stations of a cellular telephone network. The invention is particularly concerned with the reduction in system efficiency which results when a channel is allocated to a variable-rate data source, for example a discontinuous speech signal.

Some current cellular radio systems, such as GSM, make use of the discontinuous nature of speech data by only transmitting coded speech data when the speaker is actually talking. In a conventional TDMA system, such as GSM, this has the effect of reducing interference levels for other users and also saves power. However, even though transmission is avoided during null periods of the discontinuous speech data, the channel established for transmission of the speech data remains allocated to that data until the end of the call. As a result, the capacity of the system is not optimised, resulting in a reduction in system efficiency.

It is also known to provide dual mode channels for the transmission and reception of speech data as well as packet data over the same channel. One such system is described in International Patent Application WO97/22216, which is particularly suitable for providing cellular digital packet data (CDPD) services. In that system, the dual mode channel is allocated either to voice communications or to packet data communications, with voice communications having a higher priority. However, the discontinuous nature of the voice communication still results in inefficient use of the system capacity, because a continuous channel is still allocated to the discontinuous speech data.

According to a first aspect of the present invention there is provided a telecommunication system suitable for transmitting real-time data and non-real-time packet data, comprising a first and a second communication station, and having a dual mode channel for communication of both the real-time and the non-real-time data from the first to the second station, wherein the first station comprises a first transceiver which is operable to transmit both the real-time and the non-real-time data, the second station comprises a second transceiver which is operable to receive the real-time and/or the non-real-time data, and the first station further comprises a controller for generating an output data stream comprising the real-time data, the controller also allocating non-real-time packet data to the output data stream when the data rate of the real-time data is less than the full data capacity of the dual mode channel, which output data stream is transmitted by the transceiver over the channel.

In the system of the invention, non-real-time packet data is allocated for transmission when the data rate of the real-time data is less than the full data capacity of the channel. This enables the maximum system capacity to be utilised. The real-time data may comprise discontinuous speech data and the non-real-time packet data may comprise computer files or facsimile data, for example.

The first station preferably comprises a speech coding system which prepares the speech data for transmission from a speech input, and the controller receives timing information from the speech coding system indicating the timing of interruptions in the speech data stream. In this way, the speech coding system is able to provide the timing information required to enable the system to be implemented. Minimum additional hardware is thereby required in order to implement the invention.

The first transceiver preferably comprises a buffer for storing the non-real-time packet data for transmission during reductions in the data rate of the real-time data. This enables a queue of data to be prepared for transmission whenever reductions in the data rate of the real-time data stream occur.

The first station may comprise a base station, and the second station may comprise a mobile station of a cellular telecommunications network.

According to a second aspect of the present invention there is provided a station for use in a telecommunication system made in accordance with the present invention.

According to a third aspect of the present invention there is provided a method of operating a telecommunication system suitable for transmitting real-time data and non-real-time packet data, the system comprising a first and a second communication station and having a dual mode channel for communication of both the real-time and the non-real-time data from the first to the second station, the first station comprising a first transceiver which is operable to transmit both the real-time and the non-real-time data, the second station comprising a second transceiver which is operable to receive the real-time and/or the non-real-time data, wherein the method comprises controlling the allocation by the first transceiver of non-real-time packet data to an output data stream comprising the real-time data when the data rate of the real-time data stream is less than the full data capacity of the dual mode channel, and controlling the first transceiver to transmit the output data stream over the channel.

Embodiments of the present invention will now be described, by way of example, with reference to the accompanying drawings, wherein.

The invention provides a telecommunication system enabling transmission from a first station to a second station within the system, and which provides an efficient use of channel resources to enable the transmission of real-time data and packet data using a single channel. The nature of the real-time data is such that it may be regarded as having a variable rate. The transmitting station is able to modulate onto the single channel carrier both the real-time data and the packet data. The packet data is transmitted during reductions in the data rate of the variable-rate real-time data stream. The real-time data, due to its real-time delay constraints, takes priority over the packet data. One use of the invention is the transmission of real-time discontinuous speech data with packet data (such as a facsimile message, Internet files or other computer files) interspersed within the speech data. The invention is, however, also applicable to other types of real-time data, such as video transmissions.

Figure 1:
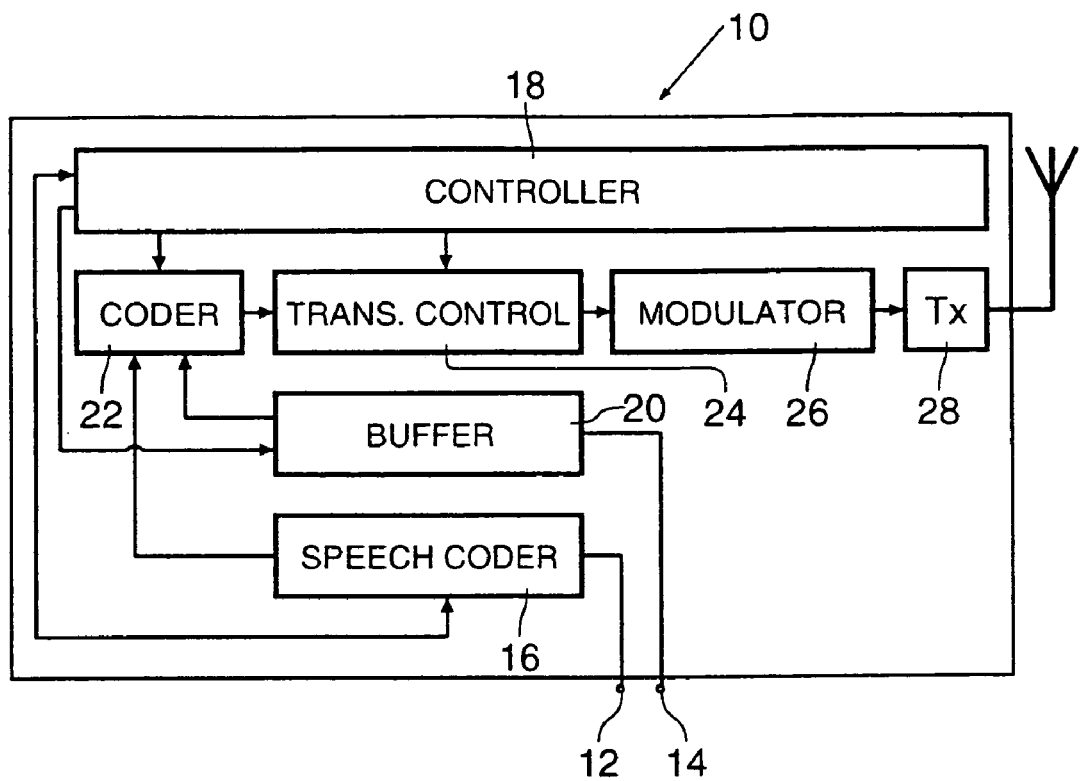
FIG. 1 shows a transmitter for use in the system of the invention.

FIG. 1 shows, in schematic form, a transmitter which can be used in the system in accordance with the invention. The transmitter 10 has a real-time data input 12 which, for the purposes of this example, will be described as a speech input, and a non-real-time packet data input 14.

The data from the speech input 12 passes to a speech coder 16 which converts the analogue speech signal into sampled digital speech data. The speech coder 16 is able to detect when there is a pause in the discontinuous analogue speech input, which results in empty digital samples. The timing of these empty samples is fed from the speech coder to an overall system controller 18. Data from the packet data input 14 is supplied to a buffer 20 which stores existing packet data for transmission in available time slots. The data from the buffer 20 and from the speech coder 16 is supplied to a coder 22 which formats the two inputs into an appropriate form for subsequent transmission. In particular, the coder combines the real-time data and the packet data, and produces discrete data packets for transmission over the channel (for example in subsequent allocated time segments if a TDMA system is being used).

In one embodiment of a system in accordance with the present invention the channel carries either a real-time or a non-real-time data stream. In this embodiment when one data stream is providing data at the full bit rate of the channel the other data stream provides no data. In a more general embodiment the instantaneous bit rates of the two data streams may take intermediate values, and the minimum bit rate of either data stream may be non zero (provided the total bit rate is less than the channel capacity). Thus the total bit rate of the channel may have a value which is less than some maximum and it may be split in any proportion between the real-time and non-real-time data streams. This latter embodiment may be particularly appropriate if the real-time data has a variable data rate.

The data from the coder passes to a transmission control unit 24 which allocates an appropriate header to each sample of data for transmission during an allocated time slot. The header may include an indication of whether the particular data sample is allocated to the real-time (speech) data or to the packet data. If required, the header may indicate which part of each individual time segment has been allocated to the speech data and which part has been allocated to the packet data. This information may, alternatively, be provided over a separate control channel controlled by the transmission control unit 24.

The transmission control unit 24 may also perform interleaving of a number of the data samples, in order to increase diversity in the transmitted channel.

The transmission control unit 24 also includes a frame generator, so that the output of the unit 24 can be supplied to a modulator 26, for modulation by the appropriate selection modulation technique, and for transmission by a transmitter 28.

The system controller 18 governs the operation of the entire system, and it will be appreciated that timing aspects are critical for allocation of the real-time data to preserve the quality of service. The skilled person will be familiar with a range of suitable techniques for implementing timing control.

The system may comprise a cellular telephone system, with a number of base stations, each communicating with a large number of mobile stations within the cell of the base station at that particular time. In the case of a TDMA system, the method in accordance with the present invention enables a particular time slot to be allocated to more than one data stream. In the case of an up-link channel, this enables different types of data provided by a mobile station, in the case that a number of applications co-exist in the mobile terminal, to be transmitted to the base station over a single allocated channel. In the case of the down-link signal, different types of data from the base station may be transmitted to a mobile over the single channel or, alternatively, different types of data may be directed to different mobile terminals within the cell.

In a TDMA system, more than one slot in a transmission time frame may be allocated to a particular communication channel. The allocation of real-time and packet data between multiple time segments within a time frame may be variable in a system operating in accordance with the present invention.

The method in accordance with the present invention may also be applied to other types of system, such as CDMA systems. In this case, if a significant part of the system transmission capacity is allocated to variable rate real-time data, the remaining system capacity can be used for non-real-time applications. The same spreading code (which defines a transmission channel) can be used for the different types of data. The concept underlying the invention may be extended to allow more than two applications to share the same transmission channel, for example a video connection, a voice connection and a packet data transmission.

Figure 2:
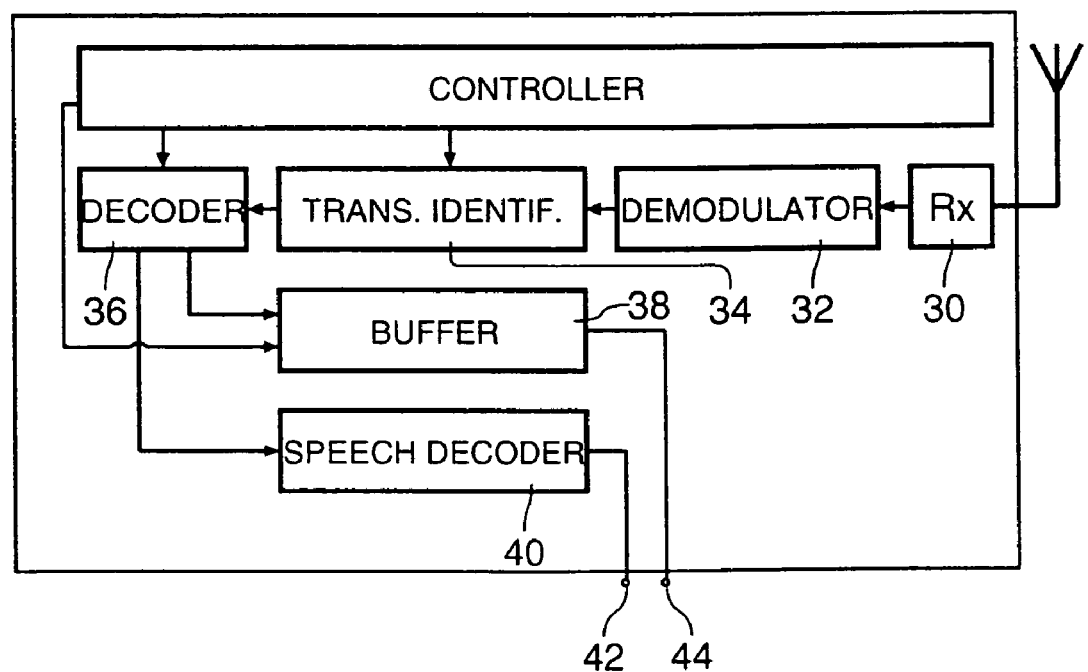
FIG. 2 shows a receiver for use in the system of the invention.

FIG. 2 shows a receiver which can be used in a system of the invention. The components of the receiver effectively carry out the inverse functions of the components of the transmitter in FIG. 1. Thus, a receiver 30 is provided which transfers the received signal to a demodulator 32 which supplies the demodulator signal to a transmission identification unit 34. The unit 34 may perform the function of de-interleaving, and reading the frame header, for example to determine which frames contain packet data and which frames contain speech data. This information is provided to the decoder 36 which reconstitutes the digital speech data and the digital packet data. The packet data is supplied to a buffer 38 and the speech data is provided to a speech decoder 40. A speech output 42 and a packet data output 44 are also provided.

Of course, in a practical system, each station will comprise a transceiver combining the features of the transmitter and the receiver described above.

Figure 3:
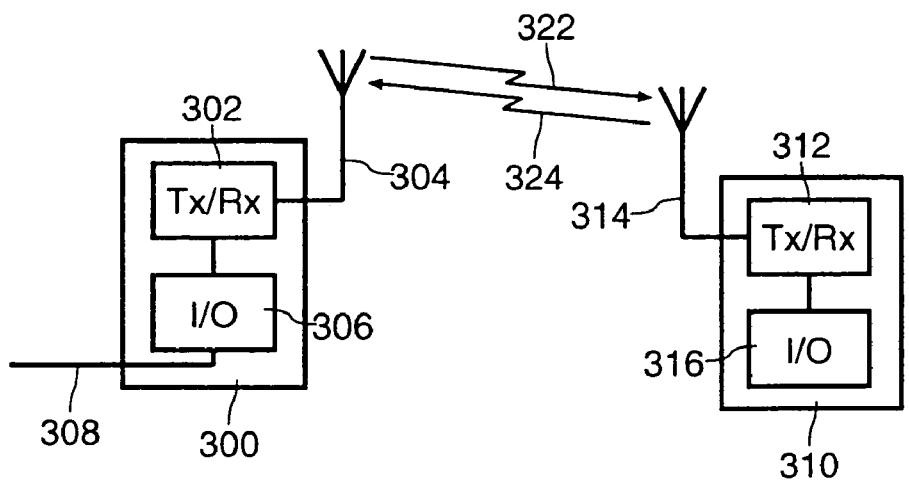
FIG. 3 is a block schematic diagram of a radio communication system.

Referring to FIG. 3, a radio communication system comprises a primary station (BS) 300 and a plurality of secondary stations (MS) 310. The BS 300 comprises a transceiver 302, including the features of the transmitter and the receiver described above, connected to radio transmission means 304, and input/output (I/O) means 306 having connection means 308 for connection to the PSTN or other suitable network. Each MS 310 comprises a transceiver 312, including the features of the transmitter and the receiver described above, connected to radio transmission means 314, and input/output means 316. The I/O means 316 may include facilities for input and output of speech, video, packet data, etc. Communication from BS 300 to MS 310 takes place on a downlink channel 322, while communication from MS 310 to BS 300 takes place on an uplink channel 324.

Figure 4:
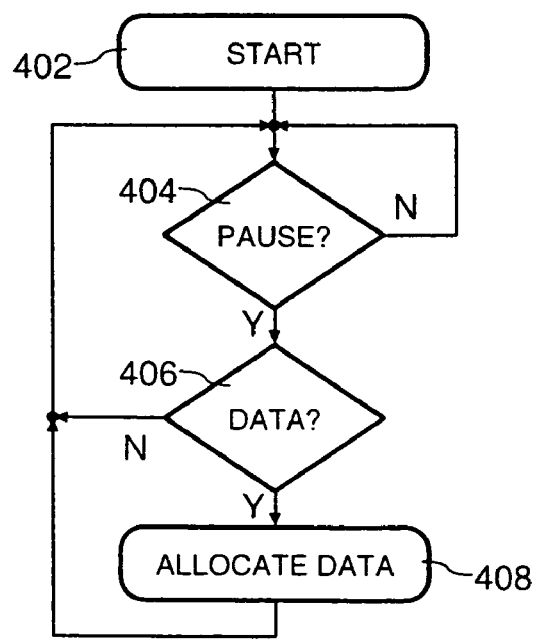
FIG. 4 is a flow chart illustrating a method in accordance with the present invention.

A method of transmitting real-time and non-real-time data using a single channel is shown as a flow chart in FIG. 4. The method starts at 402, at which point transmission of a real-time data stream is in progress. The controller 18 of the transmitting station determines at 404 whether there is a pause (or in general a reduction in data rate) in the real-time data stream. If there is, the controller 18 determines at 406 whether there is any non-real-time data in the buffer 20 awaiting transmission. If there is, the controller 18 allocates some of the non-real-time data to be transmitted, at 408, which data is passed to the coder 22 to be formatted for transmission. The controller 18 then returns to step 404, to determine if there are any further pauses in the real-time data stream.

A detailed description of the design and operation of a telecommunication system which can employ the invention has not been given, since the invention as described may be applied by those skilled in the art to existing telecommunication systems. Existing considerations relating to timing aspects, encryption aspects and detailed system architecture apply to a system to be operated according to this invention, and these considerations will be apparent to those skilled in the art.

From reading the present disclosure, other modifications will be apparent to persons skilled in the art. Such modifications may involve other features which are already known in telecommunication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

The invention claimed is:

1. A telecommunications system suitable for transmitting real-time data and non-real-time data, comprising:
    a first station and a second station, and
    a dual mode channel for communication of both the real-time data and the non-real-time data from the first station to the second station,
    wherein
    the first station comprises a first transceiver which transmits both the real-time data and the non-real-time data,
    the second station comprises a second transceiver which receives the real-time station and/or the non-real-time data, and
    the first station further comprises a controller for generating an output data stream comprising the real-time data, the controller also allocating the non-real-time data to the output data stream when the data rate of the real-time data is less than full data capacity of the dual mode channel so that at least one frame of the output stream comprises combined data including both the real time data and the non real time data, wherein the output data stream is transmitted by the transceiver over the channel including transmission of the combined data when the data rate of the real-time data is less than the full data capacity of the dual mode channel.

2. The telecommunications system as claimed in claim 1, wherein the real-time data comprises speech data.

3. The telecommunications system as claimed in claim 1, wherein the first transceiver comprises a buffer for storing the non-real-time data for transmission during reductions in the data rate of the real-time data.

4. The telecommunications system as claimed in claim 1, wherein the first station comprises a base station, and the second station comprises a mobile station of a cellular telecommunications network.

5. A telecommunications station for use in a system as claimed in claim 1.

6. A method of operating a telecommunications system suitable for transmitting real-time data and non-real-time data, the system comprising a first station and a second station and having a dual mode channel for communication of both the real-time data and non-real-time data from the first station to the second station, the first station comprising a first transceiver which transmits both the real-time data and the non-real-time data, the second station comprising a second transceiver which receives the real-time data and/or non-real-time data, wherein the method comprises the acts of:
    controlling allocation by the first transceiver of the non-real-time data to an output data stream comprising the real-time data when a data rate of the real-time data is less than full data capacity of the dual mode channel so that at least one frame of the output stream comprises combined data including both the real time data and the non-real time data, and
    controlling the first transceiver to transmit the output data stream over the channel
    including transmission of the combined data when the data rate of the real-time data is less than the full data capacity of the dual mode channel.

7. The method as claimed in claim 6, further comprising the act of storing the non-real-time data in a buffer of the first station for transmission during reductions in the data rate of the real-time data.

8. A method of transmitting data comprising the acts of:
    allocating at least first, second, and third types of data to a single output data stream, at least the first type of data being real-time data, and at least the third type of data being non-real time data, the third type of data being added when a data rate of the first type of data and/or second type of data is less than an expected capacity of a transmission channel so that at least one frame of the single output data stream comprises combined data including all three types of data; and
    transmitting the single output data stream on a single, multiple-mode channel
    including transmission of the combined data when the data rate of the first type of data and/or the second type of data is less than the expected capacity of the transmission channel.

9. The method of claim 8, wherein the first type of data is video and the second type of data is voice.

10. A CDMA transmission method comprising the acts of:
    combining data of at least two types into a single output data stream, the at least two types comprising variable rate real-time data and non-real-time data, the non-real-time data being added to the output data stream only when an expected capacity of a transmission channel is greater than the variable rate of the real-time data;
    encoding the combined data using a single spreading code, so that the combined data occupies a single transmission channel; and
    transmitting the encoded data on the single transmission channel including transmission of the combined data when the expected capacity of the transmission channel is greater than the variable rate of the real-time data;
    wherein at least one frame of the output stream comprises the combined data including both real time data and non-real-time data, and at least one frame defining a single transmission.

11. A receiving method comprising the acts of:
    receiving a data stream including at least one frame comprising both real-time speech data and non-real-time packet data in a single frame from a transmission channel;
    demodulating the data stream;
    reading one frame header to determine which part of the frame contain contains the non-real-time packet data and which part of the frame contains the real-time speech data;
    reconstituting the real-time speech data and the non-real-time packet data;
    providing the real-time speech data to a speech decoder; and
    providing a speech output signal and a packet data output signal at distinct output devices.

12. A TDMA transmission method comprising the acts of:
    accumulating non-real-time data;
    allocating real-time data to an output stream;

determining when the real-time data does not require full capacity of a transmission channel;

allocating the non-real-time data to the output stream, when the real-time data does not require the full capacity so that at least one frame of the output stream comprises combined data including both the real time data and the non-real time data; and allocating the output stream to a channel that occupies more than one time slot in a transmission time frame for transmission of the combined data on the transmission channel when the real-time data does not require the full capacity of the transmission channel.

13. A TDMA transmission method comprising the acts of:

allocating non-real-time data;

allocating real-time data and the non-real-time data in variable proportions to multiple time slots within a transmission time frame when the real-time data does not require full capacity of a transmission channel so that at least one frame of the transmission time frame comprises both the real-time data and the non-real-time data; and transmitting the transmission time frame including transmission of the combined data when the real-time data does not require the full capacity of the transmission channel.

14. The telecommunications system as claimed in claim 2, wherein the first station comprises a speech coding system which prepares the speech data for transmission from a speech input, and wherein the controller receives timing information from the speech coding system indicating timing of interruptions in the speech data stream.

15. The method as claimed in claim 6, wherein the real time data comprises speech data and the first communication station comprises a speech coding system which prepares the speech data for transmission from a speech input, the method further comprising the act of determining from the speech coding system timing of interruptions in the speech data stream.

16. A receiving method comprising the acts of:

receiving a data stream including at least one frame comprising both real-time data and non-real-time data from a single frame;

demodulating the data stream;

reading at least one frame header to determine which part of the frame contains the real-time data and which part of the frame contains the non-real-time data;

reconstituting the real real-time data and the non-real-time data; and providing the real real-time data and the non-real-time data to distinct output devices.

* * * * *